April 24, 1962 W. M. CHASE ETAL 3,031,615
DIRECT VOLTAGE STANDING WAVE RATIO MEASUREMENT
Filed Nov. 18, 1959
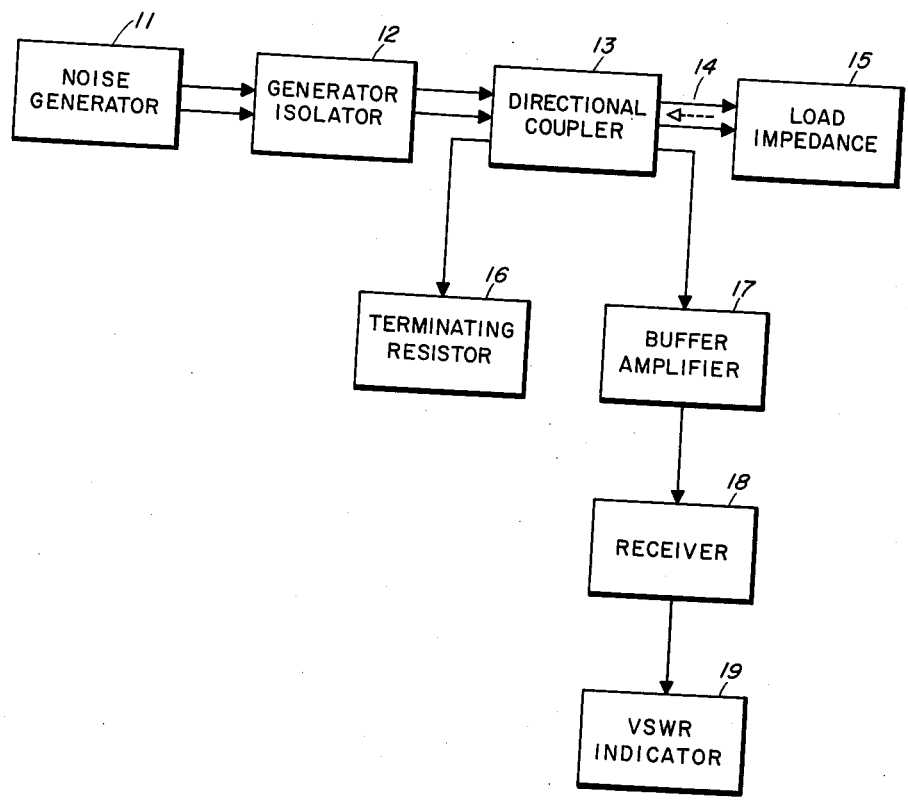
INVENTORS
WALTER M. CHASE
WILBUR E. GUSTAFSON
RICHARD F. HALL
BY JAMES L. LIEVENS
JAMES D. CAMPBELL
DOMINGO E. PORCIUNCULA
ATTORNEYS United States Patent Office 3,031,615
Patented Apr. 24, 1962

3,031,615
DIRECT VOLTAGE STANDING WAVE
RATIO MEASUREMENT
Walter M. Chase, Wilbur E. Gustafson, Richard F. Hall, James L. Lievens, James D. Campbell, and Domingo E. Porciuncula, San Diego, Calif., assignors to the United States of America as represented by the Secretary of the Navy
Filed Nov. 18, 1959, Ser. No. 853,982
8 Claims. (Cl. 324—58)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for direct voltage-standing-wave-ratio measurement and related measurements and more particularly to a method and apparatus for direct voltage-standing-wave-ratio measurement and related measurements in which any transmission of the frequency of interest will be completely masked by a wide band of noise frequencies.

There has been a long felt need in the prior art for a method and apparatus capable of reading voltage-standing-wave-ratio directly on a transmission line system and/or impedance loads. This is particularly true in the radio frequency broadcast field. The prior art methods for obtaining voltage-standing-wave-ratio readings on unknown impedances involved radio frequency bridges, slotted lines, and directional couplers. These all required sum and difference readings, or maximum and minimum readings which did not yield a voltage standing wave ratio reading directly. A further disadvantage of the prior art equipments lay in the necessity for generating a signal at the single frequency of interest. This became quite annoying in communications systems where the particular equipment under test would, in effect, jam the rest of the stations on that channel during the testing period. A further disadvantage lay in the specific signal generator requirements.

It is thus an object of the present invention to provide a system for voltage-standing-wave-ratio measurement which yields the standing-wave-ratio directly.

Another object is the provision of a voltage-standing-wave-ratio measurement system in which any transmission of the frequency of interest is masked by an equal transmission of a wide band of noise frequencies around the frequency of interest.

A further object of the invention is to provide a system for voltage-standing-wave-ratio measurement which does not require a tuned or tunable signal generator.

Still another object is to provide a system for voltage-standing-wave-ratio measurement which can be utilized to determine the optimum frequency of an unknown load impedance.

Yet another object of the invention is the provision of a system for direct voltage-standing-wave-ratio measurement which affords a means for adjusting an unknown impedance and transmission line to a desired frequency.

According to the invention, a noise generator generating a noise signal over a predetermined frequency band is coupled to the input of a directional coupler via suitable impedance matching and isolation means. The output of the directional coupler is coupled to an open transmission line resulting in maximum reflection or minimum match. The reflected signal is then passed through a variable-gain bandpass filter the output of which is indicated on a conventional decibel level meter which is calibrated directly in voltage-standing-wave-ratio. With the open transmission line the variable-gain bandpass filter is adjusted for a maximum reading on the meter which corresponds to an infinite standing-wave-ratio. When the impedance of interest is then connected to the transmission line, the resultant reflected energy will be a measure of the mismatch of the impedance and transmission line system at the frequency of the bandpass filter, i.e., no output from the bandpass filter would be indicative of no reflected power from the load impedance, giving a zero reading on the voltage-standing-wave-ratio indicator, corresponding to a 1:1 standing-wave-ratio. If it is desired to know the frequency at which the unknown impedance is tuned, it is merely necessary to vary the frequency of the bandpass filter for a minimum indication on the voltage-standing-wave-ratio indicator. If tuning of the impedance load and transmission line system is required, this can be accomplished by tuning the load and transmission line for a minimum indication on the voltage-standing-wave-ratio indicator. Thus, voltage standing wave ratio measurements can be taken directly without transmitting the particular frequency of interest, as well as adjustments being made and unknown quantities in the system being determined as desired.

Other objects and many of the attendant advantages of this invention will be readily appreciated as the same becomes better understood by reference to the following detailed description when considered in connection with the accompanying drawing in which the sole figure thereof illustrates the preferred embodiment of the present invention.

Referring now to the figure there is shown noise generator 11 connected through generator isolator 12 to the input of directional coupler 13. The output of directional coupler 13 is carried by transmission line 14 to load impedance 15. Directional coupler 13 is also coupled to terminating resistor 16 and buffer amplifier 17, the output of which is coupled to receiver 18. The output of receiver 18 is connected to voltage-standing-wave-ratio indicator 19.

Noise generator 11 can be any source of wide band noise which falls in the desired frequency range. The source utilized in the preferred embodiment is the silicon diode type which puts out a very wide band of noise, in this case from 2 to 32 megacycles. The output of this noise band is then coupled through isolator 12 which matches the impedance of the noise generator to the input of directional coupler 13, this again can be any of the conventional and well-known impedance matching network, for example, a simple resistor network. Directional coupler 13 then passes the output from isolator 12 to transmission line 14 and the impedance load 15. The reflected energy from the load impedance due to any mismatch will be coupled back through directional coupler 13 to buffer amplifier and impedance matcher 17, as is well-known in the directional coupler art. Buffer amplifier and impedance matcher 17 can be any of the well-known isolation amplifiers such as a grounded-grid or cathode follower amplifier. In the preferred embodiment a conventional grounded-grid amplifier was utilized. The output is then passed through variable-gain bandpass filter 18, which in the preferred embodiment was merely a tuned receiver, to voltage-standing-wave-ratio indicator 19. As pointed out previously, voltage-standing-wave-ratio indicator 19 can be a conventional decibel-level meter calibrated in voltage-standing-wave-ratio. Terminating resistor 16 merely terminates any coupling from directional coupler 13 in the forward direction, i.e., from isolator impedance matcher 12 to the impedance load 15.

Obviously, the reflected wave from impedance load 15 will be a complex band of frequencies such as generated by the noise generator 11. The frequency of interest, however, is singled out through bandpass filter 18, i.e., if the impedance load is desired to be tuned to 20 megacycles, the bandpass filter will then be tuned to receive 20 megacycles. In operation transmission line 14 is removed from impedance load 15 which will result in a maximum reflection of energy due to the maximum mismatch under this condition. The frequency at which bandpass filter 18 is tuned will be passed and indicated by the voltage-standing-wave-ratio indicator 19. Under the open transmission line condition the output from bandpass filter 18 is adjusted for a maximum indication, setting the zero db or infinite voltage-standing-wave-ratio reading. The load impedance can then be connected and adjusted for a minimum on the voltage-standing-wave-ratio indicator 19. If the standing-wave-ratio is 1:1, there will be no reflected power and the voltage-standing-wave-ratio indicator will indicate one, or a maximum db drop from zero db. A convenient formula for calibrating a db meter in terms of voltage-standing-wave-ratio is:

$$Pdb = -20 \log_{10} \frac{S+1}{S-1}$$

Where $Pdb$ is the power in decibels or the uncalibrated meter reading, and $S$ is the voltage-standing-wave-ratio. It is thus seen that a decibel level indicator can be calibrated directly in voltage-standing-wave-ratio in accordance with the present invention.

If it is desired to determine the frequency at which the transmission line and impedance load can be most efficiently operated, in the case of an untunable transmission line, the variable bandpass filter 18 need only be varied in frequency for a minimum indication on the voltage-standing-wave-ratio indicator 19.

Thus a simple, convenient system for measuring voltage standing wave ratios directly has been disclosed utilizing only well known conventional components with allowance for tuning a transmission line impedance load system, determining the optimum frequency of operation, and indicating directly the voltage-standing-wave-ratio. The further advantage of this system as previously pointed out lies in not jamming the particular frequency of interest due to the masking effect of the wide band of noise which will be simultaneously broadcast.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring voltage-standing-wave-ratio comprising a broadband noise generator for generating a noise signal over a predetermined frequency band, first isolating means connected to the noise generator for coupling the output of said noise generator to the input of a directional coupler having an output adapted for connection to a transmission line system and load impedance, said directional coupler having a forward direction of transmission from said isolating means to any load impedance connected thereto and a reflected direction of transmission from any load impedance connected thereto, coupling means for coupling a predetermined amount of energy, in said reflected direction, second isolating means for coupling the output of said coupling means to a bandpass filter, said bandpass filter means tuned to a frequency of interest, and amplitude responsive means calibrated in voltage-standing-wave-ratio connected to the output of said filter means.

2. The apparatus of claim 1 wherein said bandpass filter means comprises a tuned receiver.

3. The apparatus of claim 2 wherein said second isolating means comprises a buffer amplifier.

4. The apparatus of claim 3 wherein said first isolating means comprises impedance matching means.

5. The apparatus of claim 1 wherein said indicating means comprises a decibel level meter calibrated in voltage-standing-wave-ratio according to the relationship $$Pdb = -20 \log_{10} \frac{S+1}{S-1}$$

where $Pdb$ is the described drop from a no load condition, and $S$ is the voltage-standing-wave-ratio.

6. A method of measuring voltage-standing-wave-ratio comprising the steps of passing a wideband noise signal covering the band of interest into a directional coupler, leaving the output of said directional coupler open, passing the reflected signal through a narrow band variable gain filtering means, tuning said filtering means to the frequency of interest, indicating the output level on a decibel level meter, adjusting the gain of said filtering means for a maximum indication on said meter, connecting a transmission line and load of interest to the output of said directional coupler, computing the voltage-standing-wave-ratio from the decibel drop on said meter.

7. A method of tuning a transmission line and load to a predetermined frequency comprising the steps of passing a wideband noise signal covering the band of interest into a directional coupler, leaving the output of said directional coupler open, passing the reflected signal through a narrow band variable gain filtering means, tuning said filtering means to the frequency of interest, indicating the output level on a decibel level meter, adjusting the gain of said filtering means for a maximum indication on said meter, connecting a transmission line and load of interest to the output of said directional coupler, and tuning said transmission line and load for a minimum on said meter.

8. A method of determining the frequency of a transmission line and load comprising the steps of passing a wideband noise signal covering the band of interest into a directional coupler, leaving the output of said directional coupler open, passing the reflected signal through a narrow band variable gain filtering means, tuning said filtering means to the approximate frequency of interest, indicating the output level on a decibel level meter, adjusting the gain of said filtering means for a maximum indication on said meter, connecting a transmission line and load of interest to the output of said directional coupler, and tuning said filtering means for a minimum on said meter.

References Cited in the file of this patent

UNITED STATES PATENTS

| 1,794,393 | Brown et al. | Mar. 3, 1931 |
| 1,816,958 | Clark et al. | Aug. 4, 1931 |
| 1,914,414 | Fairchild | June 20, 1933 |
| 2,563,612 | Nebel | Aug. 7, 1951 |
| 2,611,030 | Sontheimer | Sept. 16, 1952 |
| 2,760,156 | Fletcher | Aug. 21, 1956 |
| 2,897,441 | Schlessel | July 28, 1959 |

OTHER REFERENCES

General Radio Experimenter, vol. XXVI, No. 7, December 1951; "A Generator of Electrical Noise."

Shurmer: "A Direct-Reading Waveguide Standing-Wave Detector for Use at Low Power Levels," Proc. of IEE, vol. 102, No. 2, Part C, September 1955; pp. 176–180.

"Noise Voltage Measurement in Low Impedance Elements," Electronic Design, May 28, 1958; pp. 94 and 95.